United States Patent
Deuss et al.

(10) Patent No.: US 6,911,900 B1
(45) Date of Patent: Jun. 28, 2005

(54) SYSTEM AND METHOD FOR ELECTRONICALLY SIGNALLING ALONG A FENCE LINE

(75) Inventors: Eberhard Juergen Deuss, Porirua (NZ); David Cristen Greager, Stokes Valley (NZ); Paul Teal, Tawa (NZ)

(73) Assignee: Tru-Test Limited, Mt. Wellington (NZ)

( * ) Notice: Subject to any disclaimer, the term of this patent is extended or adjusted under 35 U.S.C. 154(b) by 0 days.

(21) Appl. No.: 09/807,324

(22) PCT Filed: Oct. 14, 1999

(86) PCT No.: PCT/NZ99/00173

§ 371 (c)(1), (2), (4) Date: Jul. 13, 2001

(87) PCT Pub. No.: WO00/22750

PCT Pub. Date: Apr. 20, 2000

(30) Foreign Application Priority Data

Oct. 15, 1998 (NZ) .............................................. 332343
Oct. 15, 1998 (NZ) .............................................. 332344

(51) Int. Cl.[7] ........................................... H04M 11/04
(52) U.S. Cl. ............................ 340/310.01; 340/310.02; 340/310.06; 340/310.08; 340/825.7; 340/635; 341/176; 341/182
(58) Field of Search ........................ 340/310.01, 310.02, 340/635, 636, 540, 310.03, 310.06, 313, 310.08, 825.7; 700/1; 341/176, 178, 179, 182

(56) References Cited

U.S. PATENT DOCUMENTS

| 3,952,522 A | * | 4/1976 | Shettel | 405/37 |
|---|---|---|---|---|
| 4,270,735 A | * | 6/1981 | Gavin | 256/10 |
| 4,652,855 A | * | 3/1987 | Weikel | 340/310.01 |
| 4,699,197 A | * | 10/1987 | Hamrick et al. | 160/188 |
| 4,829,298 A | * | 5/1989 | Fernandes | 340/870.27 |
| 4,866,733 A | * | 9/1989 | Morishita | 375/130 |
| 5,121,711 A | * | 6/1992 | Aine | 340/573.1 |
| 5,581,229 A | * | 12/1996 | Hunt | 340/310.02 |
| 5,982,291 A | * | 11/1999 | Williams et al. | 340/635 |
| 6,081,198 A | * | 6/2000 | Adamson et al. | 340/660 |
| 6,084,505 A | * | 7/2000 | Walley | 340/310.01 |

FOREIGN PATENT DOCUMENTS

| AU | 6375898 | 11/1998 |
|---|---|---|
| EP | 0407776 | 1/1991 |
| WO | WO9413120 | 6/1994 |
| WO | WO9617440 | 6/1996 |

* cited by examiner

Primary Examiner—Jeffery Hofsass
Assistant Examiner—Daniel Prévil
(74) Attorney, Agent, or Firm—Dann, Dorfman, Herrell and Skillman, P.C.

(57) ABSTRACT

A system for electronically signalling along a fence line, comprising one or more transmitter device(s) for connection to the fence line from which control signals or information may be sent along the fence line and one or more receiver device(s) for connection to the fence line to receive control signals. Each transmitter device includes transmission means arranged to form the control signal(s) or information as one or more data blocks, generate a carrier frequency, and phase modulate the carrier with the signal and apply the phase modulated carrier to the fence line. Each receiver device includes means arranged to demodulate the transmitted signal to recover the data block(s) and process the data block(s) to recover the control signals(s) or information. The system is adapted to work with both electric and non-electric fence lines.

22 Claims, 5 Drawing Sheets

SYSTEM AND METHOD FOR ELECTRONICALLY SIGNALLING ALONG A FENCE LINE

FIELD OF INVENTION

The invention comprises a method and system for electronically signalling along either an electric or non-electric fence line.

BACKGROUND

Electric fences are used in agricultural and pastoral applications, for containing stock within a defined area, or to deter them from entering an area of crops or similar, and also in agricultural and industrial security fencing of installations such as for example power stations, prisons, and similar. An electric fence system comprises an energiser which is typically connected to mains power at a base station but may be battery powered, and which is connected to a fence line and emits a high voltage pulse approximately every second to the fence line. The intensity of the pulse is such that it deters animals and persons from touching the electric fence.

An electric fence may often be many kilometers in length, particularly in agricultural and pastoral applications. At least one system is now available which includes a remote control unit which may be carried by a farmer and which enables the farmer to energise or de-energise the fence from any point on the fence line, by remotely turning the energiser off and on. The remote control unit is applied to the fence line and transmits a coded signal along the fence line to the energiser. NZ patent specification 258240 describes such a system in which the control signal sent from the remote unit to a receiver in the energiser is a coded digital signal.

SUMMARY OF INVENTION

The present invention provides an improved or at least alternative method and system for electronically signalling along a fence line, for example from a hand held remote control unit to a base station, or from a hand held remote control unit or a base station to one or more devices along the fence line, or to otherwise transmit control signals or information along the fence line.

In broad terms in one aspect the invention comprises a system for electronically signalling along an electric or non-electric fence line, comprising:

(a) one or more transmitter device(s) comprising a hand held remote control unit and/or other device for connection to the fence line from which control signals or information may be sent along the fence line and including transmission means arranged to form the control signal(s) or information as one or more data blocks, generate a carrier frequency, and phase modulate the carrier with the signal and apply the phase modulated carrier to the fence line, and (b) one or more receiver device(s) for connection to the fence line to receive control signals or information transmitted along the fence line and including receive means arranged to demodulate the transmitted signal to recover the data block(s) and process the data block(s) to recover the control signal(s) or information.

Where the system is used on an electric fence line a receiver device may be interfaced to a switching means arranged to disconnect or reconnect the electric fence energiser from or to the fence line or turn the electric fence energiser on or off, or may be interfaced to a switching means connected in series between the energiser and the fence line to disconnect or reconnect the electric fence energiser from or to the fence line.

In addition one or more receiver devices may be interfaced to a switching means to form an isolator enabling disconnection or reconnection of a part of the fence line from or to the electric fence energiser. As another example a receiver device may be interfaced to a gate controller arranged to control opening or closing of a gate, or to any other device for controlling any function or for signalling along the fence line for any purpose. The system may also or alternatively comprise a fence line voltmeter as a transmitter device, for transmitting signals indicative of voltage at a point on the fence line, either on receiving a control signal polling the voltmeter or on the occurrence of a predetermined voltage condition on the fence line.

Preferably the or each receiver device(s) is/are arranged to transmit a response signal or information along the fence line on receipt of a control signal or information by the receiver device.

Most preferably the system includes a hand held remote control unit, including a contact part adapted to be touched to the fence line for transmission of control signals or information along the fence line and a display for displaying transmitted or received signals or information.

A base station may comprise a receiver and a transmitter. The base station may be capable of sending signals to a hand held control unit or to other devices and or/of polling the status of the other devices. The base station may be adapted to be connected to a computer and may itself be based on a microcontroller or microprocessor.

In the system and method of the invention, a carrier frequency is phase modulated by data comprising control signals or other information to be transmitted along the fence line and the modulated carrier is applied to the fence line and at the receive end is demodulated.

In particular an electric fence line is a unique signalling medium, in that it is also carrying a continuous series of discrete high voltage pulses which can make use of the fence line as a signalling medium extremely difficult, and because the fence line is not an electrically robust signalling medium—a fence line can often be tens of kilometers long and include electrically defective joints along the fence line or vegetation touching the fence line. It is believed that the method and system of the invention will provide improved performance relative to systems currently available.

For the purposes of this specification "electric fence line" includes both fence lines which carry a continuous series of high voltage pulses and also fence lines which while not carrying high voltage pulses at all times can be triggered for example by a person touching the fence line or a part of a multi-stranded or wire netting fence line for example, to then immediately electrify the fence.

Use of a non-electric fence line as a signalling medium is also problematic. The non-insulated wire forming the fence line is attached directly to the fence posts or standards or similar. Typically these are formed from wood (which may have a significant moisture content) or concrete for example, and the fence line is not an electrically robust signalling medium. Again the fence line can be long and include electrically defective joints along the fence line. It is believed that the method and system of the invention will provide acceptable signalling performance even on such non-insulated fence lines.

For the purposes of this specification "non-electric fence line" includes single strand fence lines, multi-strand fence lines, fence netting and any other types of fence line not connected to an electric fence energiser.

BRIEF DESCRIPTION OF THE DRAWINGS

Preferred forms of the system of the invention are described by way of example and without intending to be limiting, with reference to the accompanying drawings wherein.

DETAILED DESCRIPTION OF PREFERRED FORMS

The preferred form system for signalling on an electric fence line of FIGS. 1 to 4 is described with reference to electric fencing in an agricultural or pastoral application, by way of example, but the invention and the preferred form system described is equally applicable to electric security fencing and other electric fencing applications.

Figure 1:
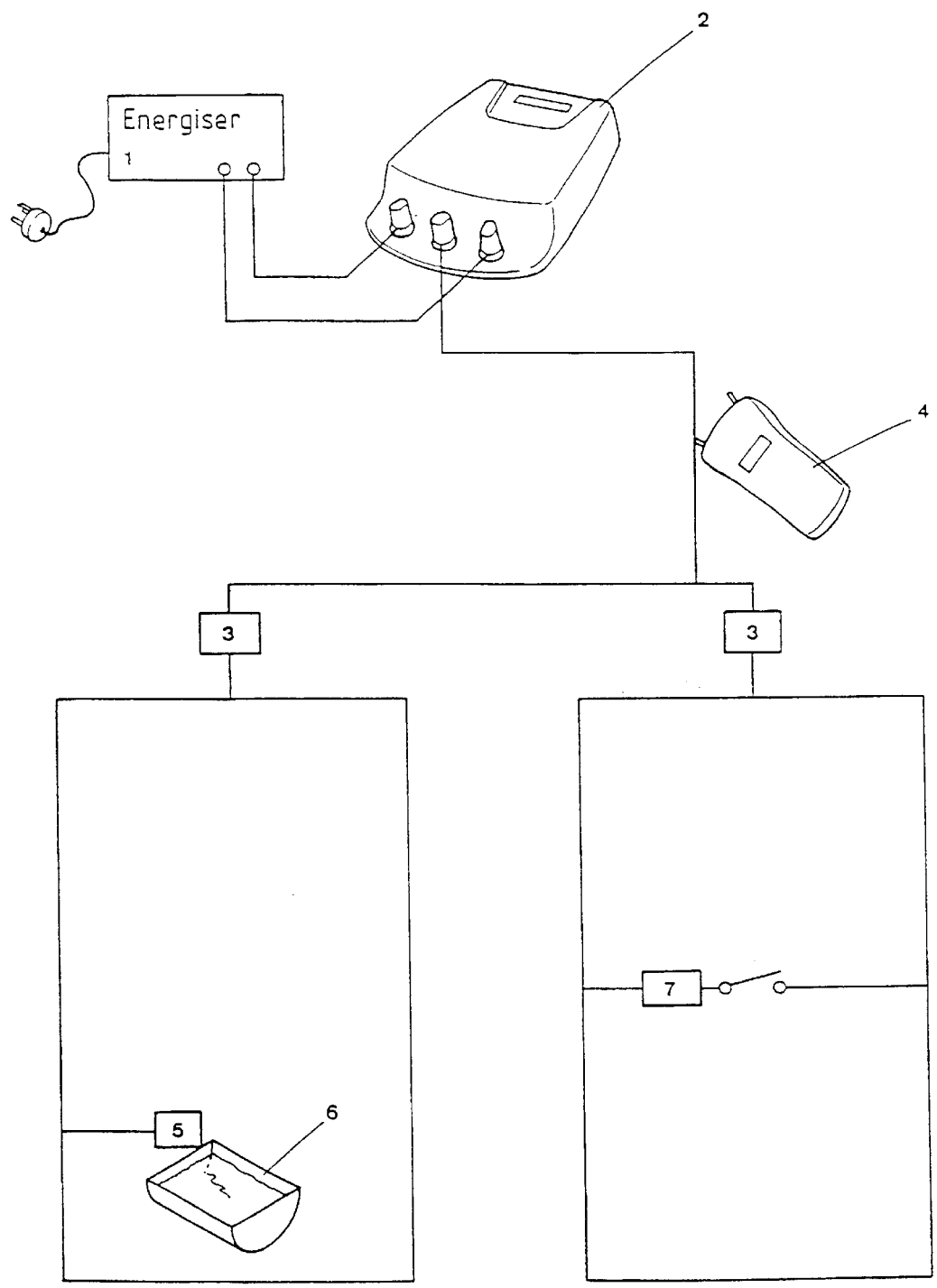
FIG. 1 schematically shows a preferred form system of the invention for signalling on an electric fence line, comprising an energiser base station, a number of other devices connected to the fence line, and a hand held remote control unit.

Referring to FIG. 1, an electric fence energiser 1 which is typically positioned at a house or building on a farm and is mains powered but may be a battery powered energiser, is connected through a base station 2 which is a component of the system of the invention, to a fence line which defines a number of paddocks or similar. The base station 2 may be physically incorporated in the energiser housing, or may be a separate module which is connected in series between the energiser and the fence line as shown and may be sold as an after market item which can be retrofitted to an existing fence line for example.

Figure 3:
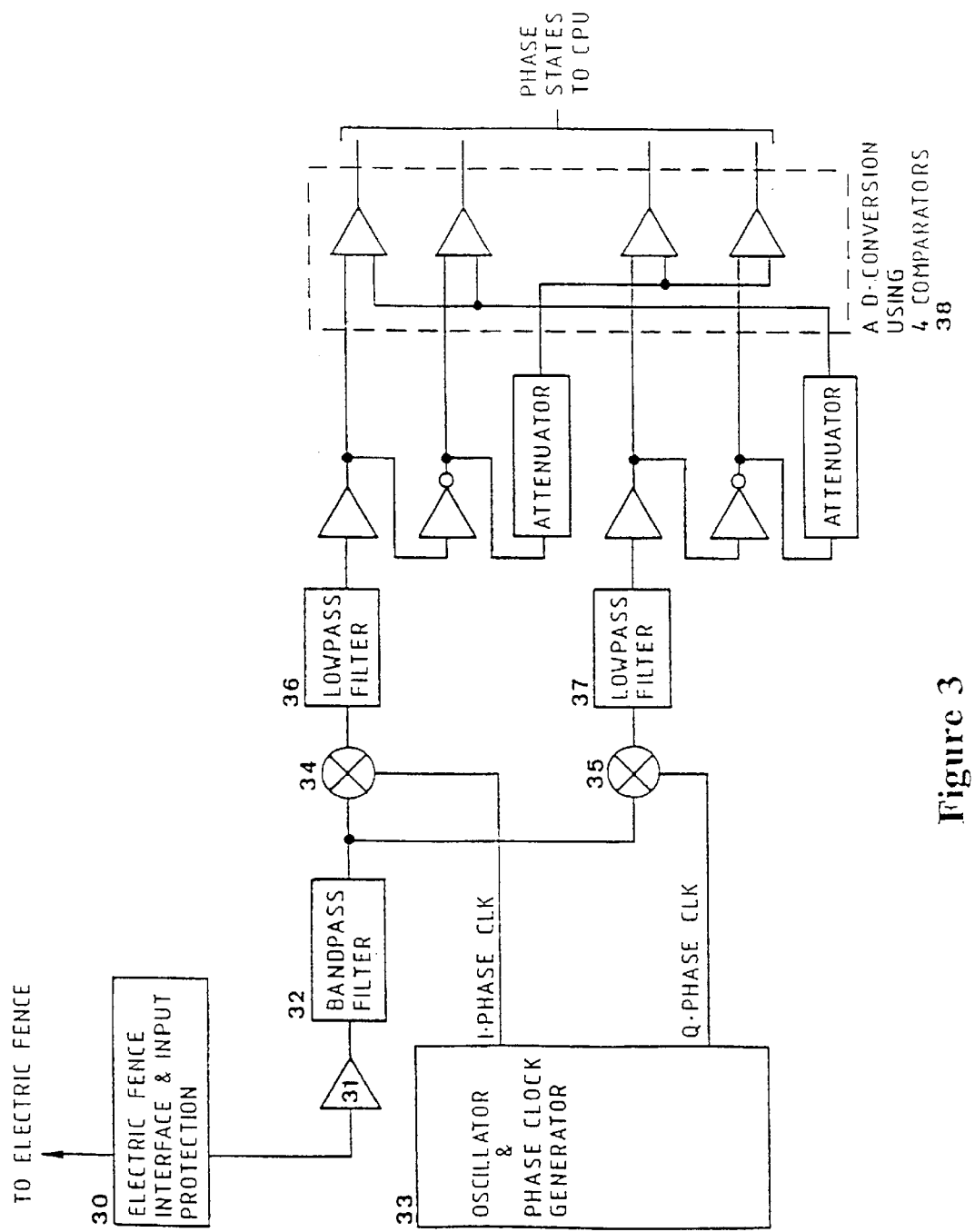
FIGS. 3 and 4 are block diagrams of receive and transmit electronics in the base station of the preferred form system for receiving control signals or information sent along the fence line and also able to transmit control signals or information along the fence line from the base station, and which may be implemented in any other device which is to be connected to the fence line where both transmit and receive functionality is required.
Figure 4:
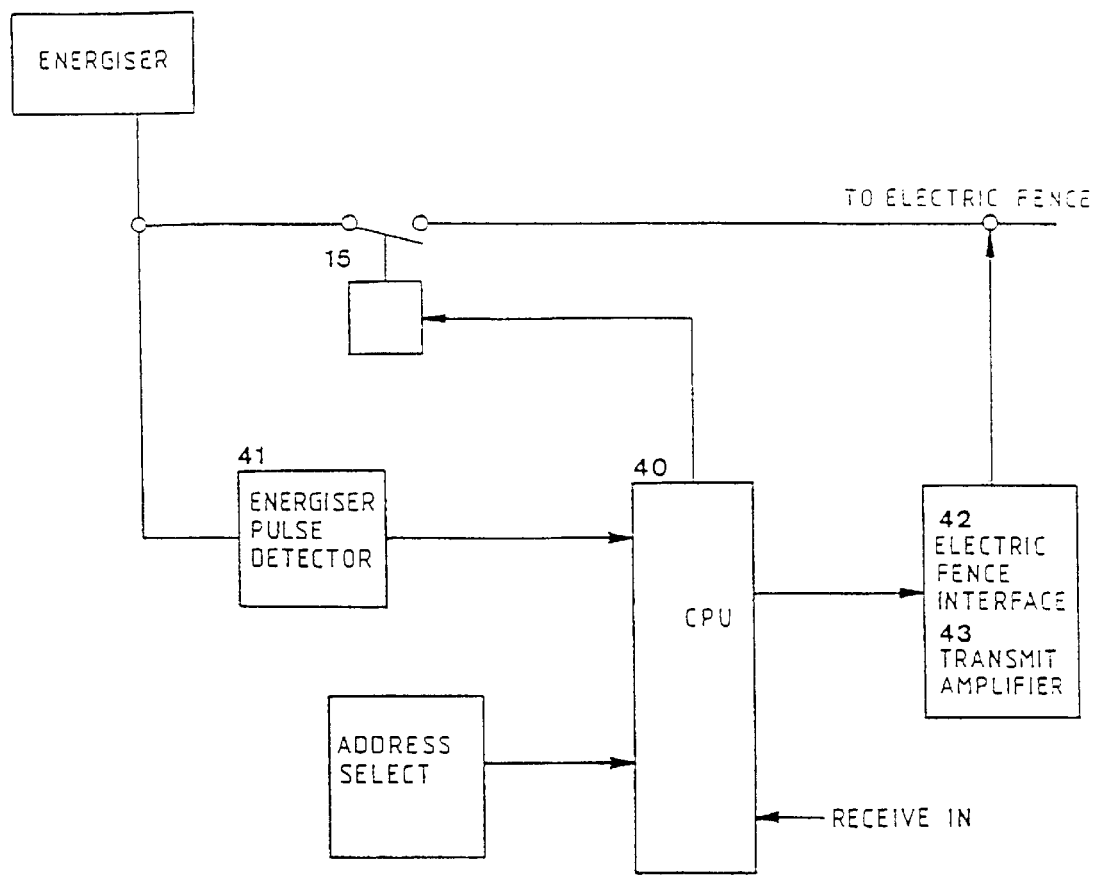

The base station 2 comprises a receiver which can receive control signals and other information transmitted along the fence line, for example from a hand held remote control unit 4 carried by a farmer. In the preferred form the base station 2 incorporates both receive and transmit electronics as shown in FIGS. 3 and 4, and a switch 15 (see FIG. 4) such as a solenoid activated switch, a motor driven or electronic switch, or other suitable form of switch within or associated with the base station, through which the energiser is connected to the fence line. The switch in the base station 2 may be operated on receipt of a remotely transmitted control signal to disconnect or reconnect the energiser from and to the fence line.

Figure 2:
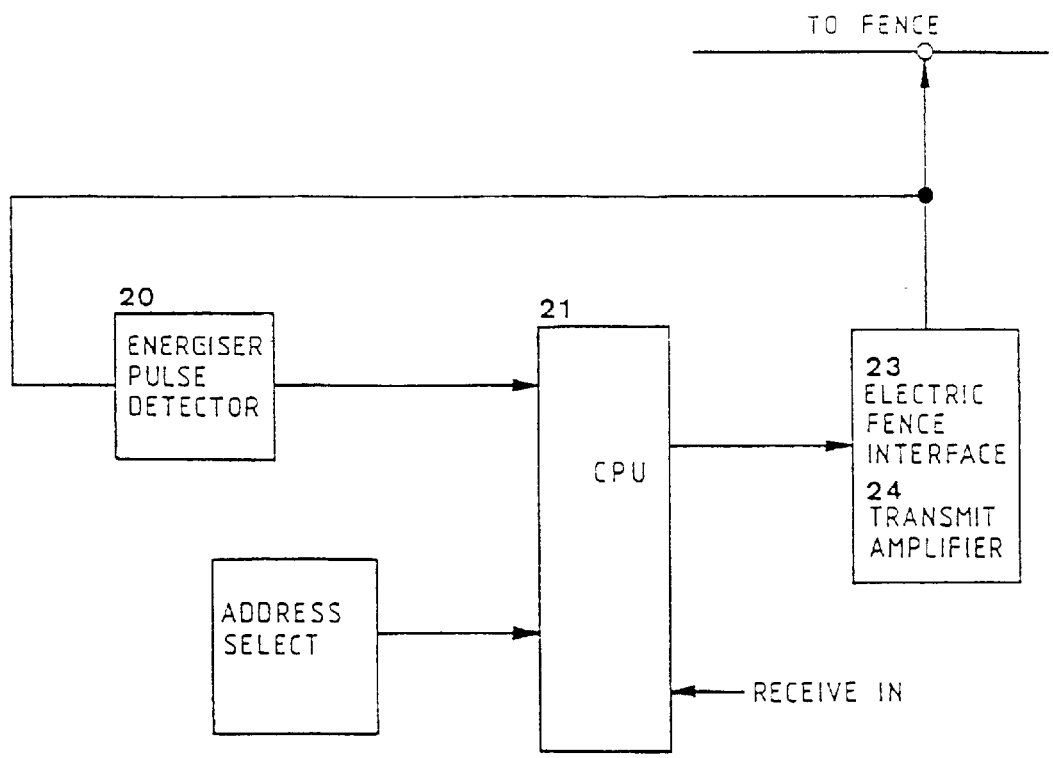
FIG. 2 is a block diagram of transmit-only electronics for implementing any device which is to be connected to the fence line where transmit-only functionality is required, to transmit control signals or information over the fence line.

The hand held remote control unit 4 or other transmit device may optionally comprise only transmit electronics as shown in FIG. 2, but preferably has both transmit and receive functionality using similar transmit-receive electronics of FIGS. 3 and 4 as in the base station 2, so that the remote control unit may be used not only to send a control signal to the base station 2 to disconnect or reconnect the energiser to the fence line for example, or to any other device connected to the fence line, but may also receive a signal sent back along the fence line from the base station (or other device) to verify receipt of the transmitted control signal. The remote control unit 4 may incorporate a small display in addition to a keypad by which the user may send control or other signals or poll any device connected to the fence line to return transmit data or information, as may the base station 2.

In the system described above the remote control unit or other transmit device may be used to signal over the fence line to the base station 2 to cause the base station to disconnect the energiser from and reconnect the energiser to the fence line. In an alternative embodiment the receive electronics may be associated with the energiser and incorporated within the energiser housings and may operate to turn the energiser off or on by controlling a switch in the power supply to the energiser for example. Alternatively again the receive electronics may be incorporated in a separate unit positioned between the power supply and the energiser which may be sold as an after market item which can be used with an existing energiser to enable turning on and off the energiser.

Instead of or in addition to a hand held remote control unit, signals may be transmitted to the base station 2, or along the fence line from one device to another connected to the fence line for any reason, from a remote device which may be in a fixed physical position such as at a gate, building, etc and from which a control signal may be sent to disconnect or reconnect the energiser from or to the fence line or turn the energiser on and off, or a control signal or signals or information may be sent to any other device or for any other purpose using the fence line as the signalling medium. FIG. 1 shows a number of isolators 3 provided at points along the fence line as shown. Each isolator 3 may comprise receive electronics and an associated switch enabling individual sections of the fence line to be disconnected and subsequently reconnected, by signalling from the hand held remote control unit 4 when a farmer wishes to repair a particular section of the fence line without de-energising the entire electric fence system for example, or alternatively by signalling from a transmitter in the base station 2 for example, again using the fence line as the signalling medium. The isolator(s) may also comprise transmit electronics for sending a verification signal on receipt of a disconnect or reconnect signal to the isolator over the fence line, or to enable the isolator to send a status signal to the remote control unit or base station if polled by a signal from the remote control unit or base station as to the status of the isolator.

Also as shown in FIG. 1 as another example, a transmitter 5 associated with a water trough 6 incorporating a level monitoring device may use the fence line as a signalling medium to transmit a signal to the base station or to the hand held remote control unit indicating if the water level in the water trough is low, or indicating the water level in response if polled by a signal from the remote control unit or base station.

Further, the hand held remote control unit or base station may be used to transmit a control signal along the fence line to a gate controller 7 of an electric opening gate to command the gate controller to open or shut an electric gate. Again electronics at the gate controller may be both receive and transmit electronics to enable sending of a verification signal or a signal indicating gate status in response to a poll signal sent along the fence line.

As yet a further example voltage sensing devices positioned along the fence line may incorporate transmit and receive electronics to transmit a signal to the base station if the fence voltage at a distant part of the fence line is reduced below a predetermined threshold, caused by vegetation growing against the fence line or similar, or to transmit a voltage level signal or low voltage signal if polled from the hand held remote control unit or base station or any other device connected to the fence line.

As described above, devices connected to the fence line may comprise transmit or receive only electronics, or both. Thus, the system of the invention may use the electric fence line as a signalling medium for controlling various devices and transmitting and receiving information to provide a farm management system with a high degree of functionality for multiple applications.

FIG. 2 is a block diagram of a preferred form transmit only hand held remote control unit. The unit comprises an external casing with a contact part such as a metal probe or ear which is touched against the fence line in use, and one or more buttons or a keypad and preferably a small display. Data blocks comprising control signals or other information are transmitted, between energiser pulses in an electric fence system, and energiser pulse detector 20 provides timing information to the CPU 21 for data synchronisation. Electric fence interface 23 protects transmit driver 24 from the high voltage energiser pulses and at the same time couples the transmitter to the electric fence. The CPU 21 encodes the data blocks which are then used to phase modulate a carrier frequency. The carrier frequency generation as well as the modulation of the digital data stream to a phase encoded pseudo sine wave is in the preferred form all done in software. If "1" is transmitted the carrier phase is advanced by 90 degrees and if a "0" is transmitted the phase is retarded by 90 degrees.

FIG. 3 is a block diagram of a preferred form of receive electronics, which may be implemented in an energiser base station, hand held control unit 4, or other device connected to the fence line. Electric fence interface and input protection circuit 30 matches the fence to input amplifier 31 and protects the receiver from the energiser pulses. The input protection circuitry is on a virtual earth of the amplifier and operates when the output of the first amplifier saturates.

Band-pass filter 32 provides some rejection of mains and broadcast band interference. The filter has two identical low Q stages. The low Q prevents the output ringing at the signalling frequency due to impulse noise, and reduces the sensitivity of the design to component variation.

Oscillator and clock generator 33 provides switching signals to both in phase and quadrature phase detectors 34 and 35. In the preferred form circuitry described the clock signal is not phase locked to the transmitted carrier (but this is possible in an alternative configuration) but both the clock generators must be accurate to for example 200 ppm.

The band-limited signal is demodulated by the phase detectors 34 and 35 and subsequently low pass filtered by filters 36 and 37. The output of each phase detector is inverted and attenuated providing, in the preferred form, six outputs to an analogue to digital conversion stage 38 comprising four phase state comparators. The four outputs of the comparators are combined to represent 8 phase differences between the incoming signal and the local clock (0°, ±45°, ±90°, ±135° and 180°). The outputs of the comparators are supplied to and compared in a CPU (not shown in FIG. 3 but see below with reference to FIG. 4) with the output during the previous data period and the phase difference calculated. If a phase advance is detected the data bit is a "1" otherwise it is a "0". Referring to FIG. 4, the decoded data block is supplied to the CPU 40. FIG. 4 shows implementation in an energiser base station and solenoid activated switch 15 is controlled by the CPU to, on receipt of a control signal, disconnect or connect the energiser from or to the fence line. In other cases the CPU 40 output will control other devices where the receiver stage is associated with other devices connected to the fence line.

FIG. 4 includes a transmit stage associated with the energiser base station. Again control signals or information is formatted into data blocks which are phase modulated with a carrier frequency in CPU 40. The data blocks are transmitted between energiser pulses and energiser pulse detector 41 provides timing information to the CPU 40 for data synchronisation. Electric fence interface 42 protects transmit driver 43 from the high voltage energiser pulses and at the same time couples the transmitter to the electric fence.

Figure 6:
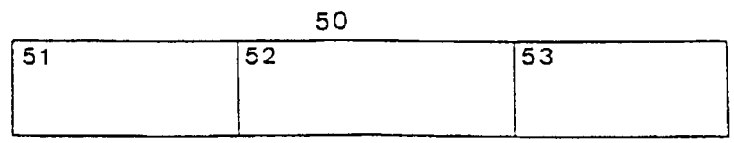
FIG. 6 illustrates the format of the control signals in the preferred form systems.

Referring to FIG. 6 in the preferred form system the data blocks consist of a pseudo random noise sequence 51 followed by the data bits 52 and then a BCH error correction code 53. Upon initialisation the CPU reads the address of the base station which is also the farm address. The address is basically one of several pseudo random noise (PRN)-sequences of maximal length which is used for message synchronisation. The CPU encodes the data by calculating the BCH error correction code from the data to be transmitted and appends both the data and the BCH code to the PRN sequence. The receiver synchronises only to the selected PRN sequence and when a valid data packet arrives the block of data is decoded checked for errors and if necessary corrected.

Figure 5:
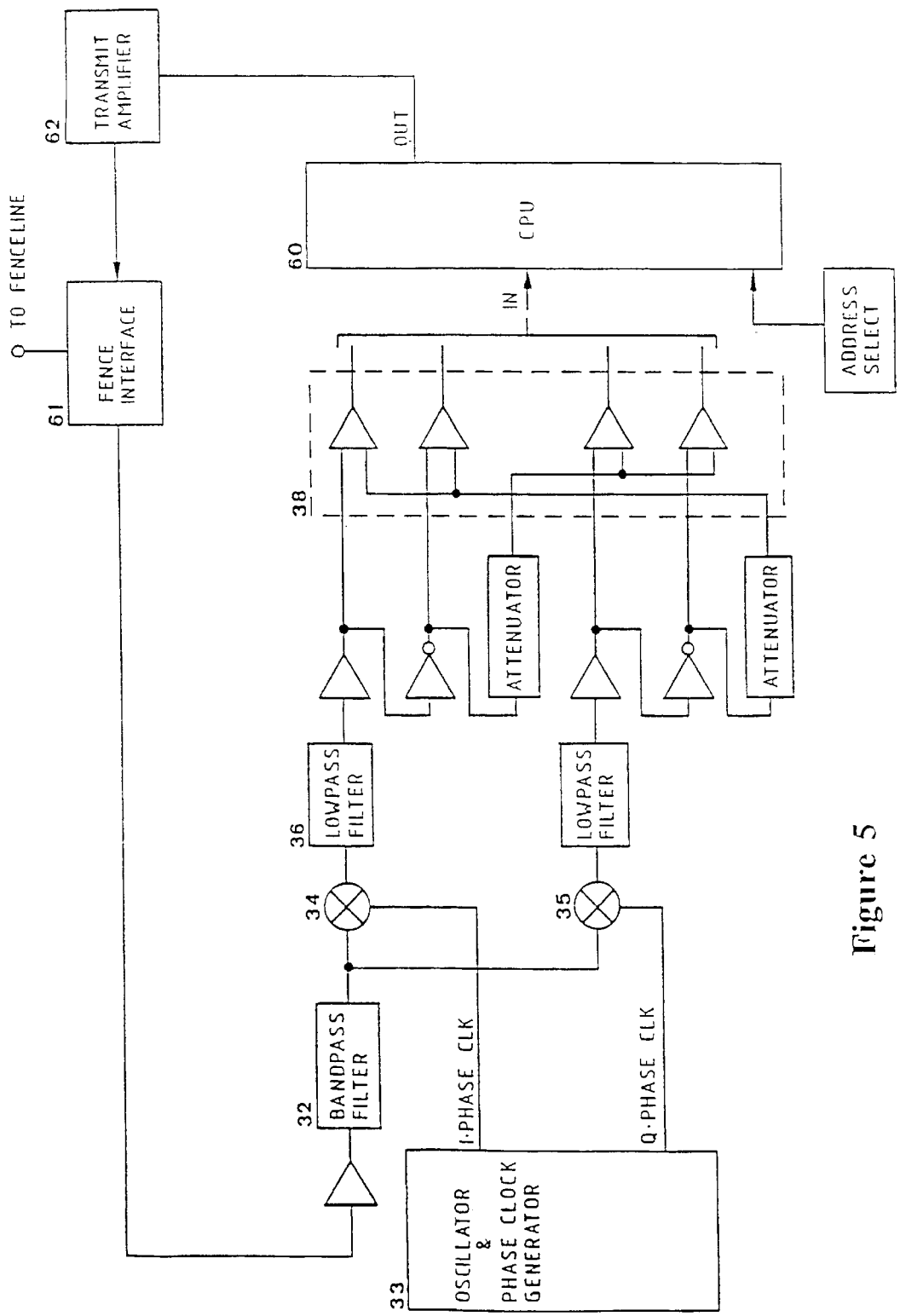
FIG. 5 is a block diagram of receive and transmit electronics for implementation in any device to be connected to a non-electric fence line for signalling over the fence line.

FIG. 5 is a block diagram of receive-transmit electronics for implementation in any device to be connected to a non-electric fence line for signalling over the fence line. In a non-electric fence system there is no energiser. The signalling system of the invention may be used for signalling on a non-electric fence line to send information from a base station or hand held remote control unit to devices connected to the fence line such as gate controllers or any other devices connected to the fence line, or simply for use of the fence line as a transmission medium between different locations on a farm or any other installation or application where it is desired to use the fence line as a signalling medium. Each device may comprise receive electronics, transmit electronics or both receive and transmit electronics. Because in a non-electric fence application the fence line does not carry high voltage pulses the pulse detector and input circuitry is not required. Otherwise the operation of the receive and transmit electronics is similar to that of FIGS. 2 and 3. CPU 60 encodes control signals or other information for transmission as data blocks, which in the preferred form again consist of a pseudo random noise sequence followed by the data bits and then a BCH error correction code, which are then used to phase modulate a carrier frequency to a phase encoded pseudo sine wave. Fence interface 61 connects transmit amplifier 62 to the fence line. Fence interface 61 also matches the fence to an input amplifier and band-pass filter 32. Oscillator and clock generator 33 provides switching signals to both in phase and quadrature phase detectors. The band-limited signal is demodulated by the phase detectors and subsequently low pass filtered. The output of each phase detector is inverted and attenuated providing six outputs to an analogue to digital conversion stage 38 comprising four phase state comparators. The outputs of the comparators are supplied to and compared in the CPU 60 with the output during the previous data period and the phase difference calculated. The decoded data block is supplied to the CPU 60. The receiver synchronises only to the selected PRN sequence and when a valid data packet arrives the block of data is decoded checked for errors and if necessary corrected.

As indicated above the invention and the preferred form transmit and receive electronics described above are equally applicable to transmission of control signals or information along a fence line which is electrified for security purposes, including a fence line which is not electrified unless first touched by a person in which event electrification of the fence line by voltage pulses is immediately triggered. A security fence line may be used for transmitting information from hand held control units or communication units carried by persons such as security guards for example, each of which has a unique code.

The foregoing describes the invention including a preferred form thereof. Alterations and modifications as will be obvious to those skilled in the art are intended to be incorporated in the scope hereof.

What is claimed is:

1. A system for electronically signalling along a fence line, comprising:
   (a) a portable remote control transmitter device for connection to the fence line from which control signals or information may be sent along the fence line and including transmission means arranged to form the control signal(s) or information as one or more data blocks, generate a carrier frequency, and phase modulate the carrier with the signal and apply the phase modulated carrier to the fence line, and
   (b) one or more receiver device(s) for connection to the fence line to receive control signals or information transmitted along the fence line and including receive means arranged to demodulate the transmitted signal to recover the data block(s) and process the data block(s) to recover the control signal(s) or information.

2. A system according to claim 1 wherein the fence line is an electric fence line.

3. A system according to claim 2 wherein a receiver device is interfaced to a switching means arranged to disconnect or reconnect and electric fence energiser from or to the fence line or turn an electric fence energiser on or off.

4. A system according to claim 2 wherein a receiver device is housed in a base station unit adapted to be connected in series between an electric fence energiser and the fence line and incorporating a switching means arranged to disconnect or reconnect the electric fence energiser from or to the fence line.

5. A system according to claim 2 including a receiver device interfaced to a switching means to form an isolator enabling disconnection or reconnection of a part of the fence line from or to the electric fence energiser.

6. A system according to claim 2 including a receiver device interfaced to a gate controller arranged to control opening or closing of a gate.

7. A system according to claim 2 including a transmission means associated with the or each receiver device, arranged to transmit a response signal or information along the fence line on receipt of a control signal or information by the receiver device.

8. A system according to claim 2 including a fence line voltmeter as a transmitter device, for transmitting signals indicative of voltage at a point on the fence line, either on receiving a control signal polling the voltmeter or on the occurrence of a predetermined voltage condition on the fence line.

9. A system according to claim 2 including a transmitter device which is a hand held remote control unit including a contact part adapted to be touched to the fence line for transmission of control signals or information along the fence line.

10. A system according to claim 9 wherein the hand held control unit includes a display for displaying transmitted or received signals or information.

11. A system according to claim 1 wherein the fence line is a non-electric fence line.

12. A system according to claim 11 wherein the transmission means of the transmitter device(s) comprises a central processing unit, an address select unit, a fence interface, and a transmit amplifier.

13. A system according to claim 12 wherein the receive means comprises a fence interface means, a fence input amplifier, a band pass filter, at least one low pass filter, oscillator and clock generation means, at least one attenuation means, analogue to digital conversion means, and a central processing unit.

14. A system according to claim 13 wherein the transmitter device(s) is/are arranged to format the data block(s) as a pseudo random noise sequence, data bits, and an error correction code.

15. A system according to claim 14 wherein the error correction code is a BCH code.

16. A system according to claim 2 including a transmitter device which is a hand held remote control unit and also incorporating receive means arranged to demodulate signals received over the fence line to recover signals or information.

17. A system according to claim 16 wherein the hand held control device comprises a display for displaying transmitted or received signals or information.

18. A system according to claim 2 wherein said transmission means of the transmitter device(s) comprises an energiser pulse detector means, a central processing unit, an address select unit, an electric fence interface, and a transmit amplifier.

19. A system according to claim 18 wherein the receive means comprises an electric fence interference and input protection means, a fence input amplifier, a band pass filter, at least one low pass filter, oscillator and clock generation means, at least one attenuation means, analogue to digital conversion mens, and a central processing unit.

20. A system according to claim 19 wherein the transmitter transmitter device is arranged to format the data block(s) as a pseudo random noise sequence, data bits, and an error correction code.

21. A system according to claim 20 wherein the error correction code is a BCH code.

22. A method of electronically signaling along a fence line comprising in a portable control device having a transmitter and being connected to the fence line, the steps of forming the signal as one or more data blocks and phase modulating a carrier frequency with the signal and applying the phase modulated carrier to the fence line, and at a receiver also connected to the fence line, the steps of demodulating the transmitted signal to recover the data blocks and processing the data block(s) to recover the control signal.

\* \* \* \* \*